Patented Dec. 5, 1922.

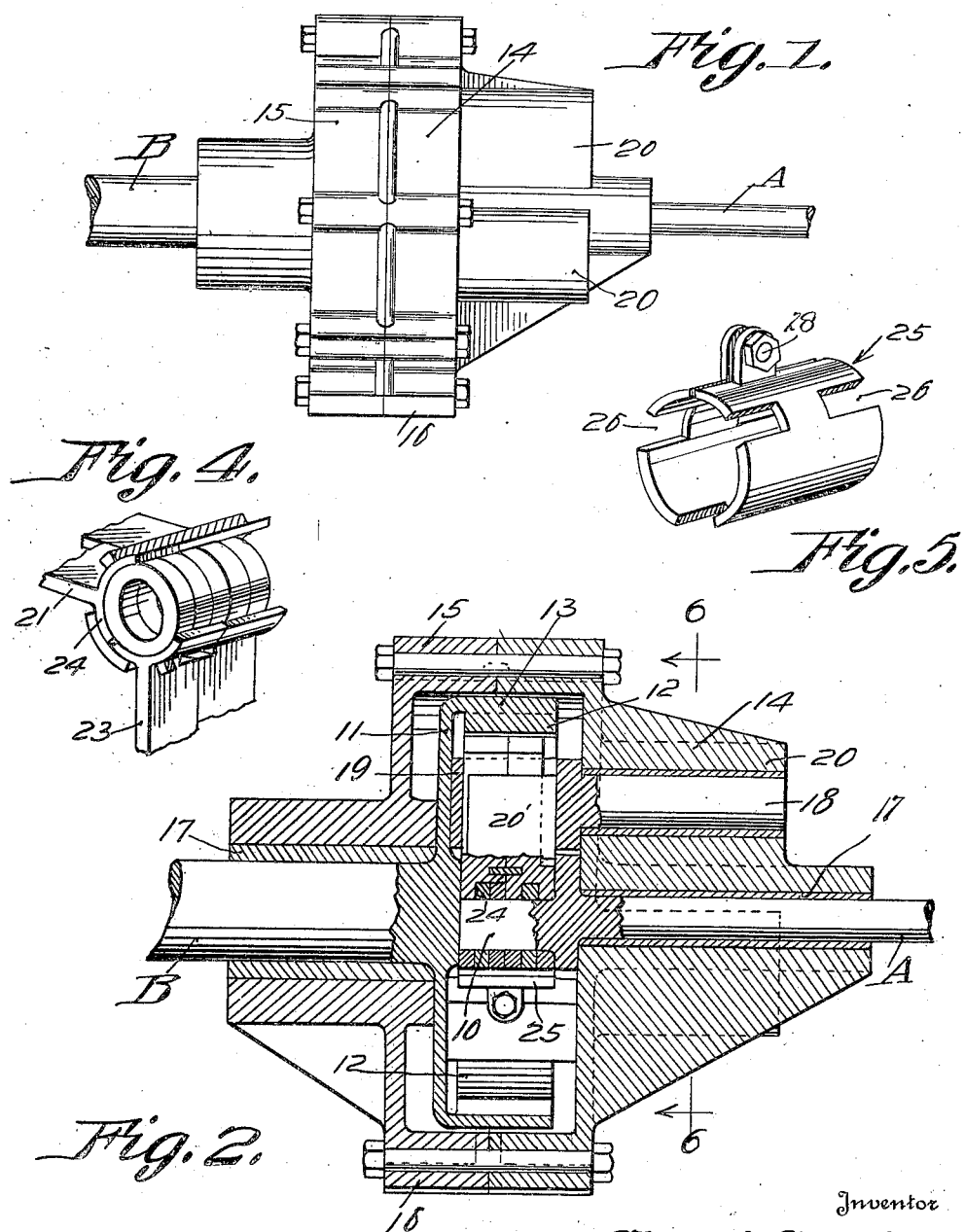

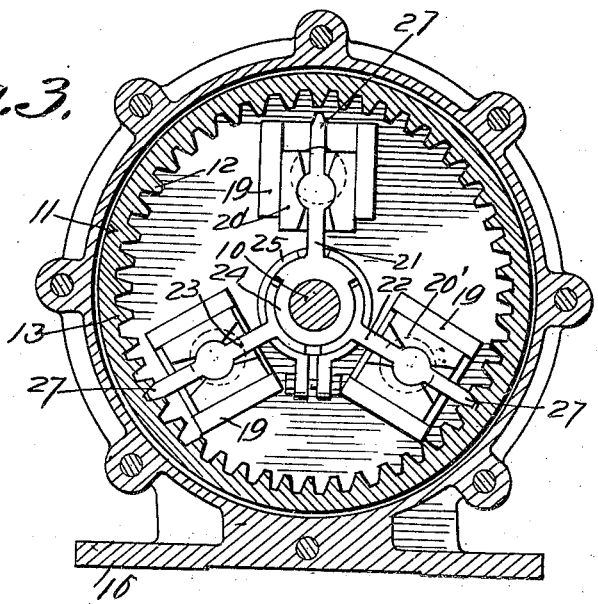
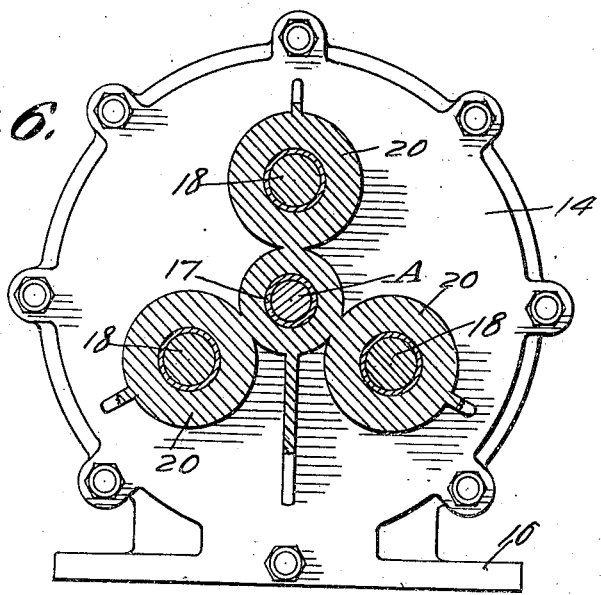

1,437,779

UNITED STATES PATENT OFFICE.

GLENN ARTHUR SHAFFER, OF GREEN BAY, WISCONSIN, ASSIGNOR OF FORTY-TWO AND ONE-HALF PER CENT TO FRANKLIN H. WIRTZ, OF GREEN BAY, WISCONSIN.

INTERMITTENT-OPERATING MECHANISM.

Application filed February 7, 1917, Serial No. 147,150. Renewed May 6, 1922. Serial No. 559,059.

*To all whom it may concern:*

Be it known that I, GLENN A. SHAFFER, a subject of the King of Great Britain, residing at Green Bay, in the county of Brown and State of Wisconsin, have invented certain useful Improvements in Intermittent-Operating Mechanism, of which the following is a specification, reference being had therein to the accompanying drawing.

The invention relates to a gearing, and more particularly to a pinion construction.

The primary object of the invention is the provision of a gearing of this character wherein the same may give any ratio of speed that cannot possibly be obtained by the use of a single gear and pinion, thus making gear trains unnecessary and saving valuable space by the elimination of any external moving parts, which is conducive to safety.

Another object of the invention is the provision of a gearing of this character wherein noise will be almost entirely eliminated, and which will require minimum attention and a reduction in the number of parts to be replaced when worn, the parts which may require replacement being simple in form.

A further object of the invention is the provision of a gearing wherein power may be delivered by a motor or other prime mover at one reduction of speed direct to the driven member without the use of a train of gearing or other like construction.

A still further object of the invention is the provision of a gearing which is of self-locking type so that the said gearing will be useful in hoists of any kind, such as elevators, cranes and the like, and the necessity of a brake will be obviated as the friction of the motor or other prime mover is so great that the load will not be able to move the motor through the maximum degree of reduction or ratio of gearing.

A still further object of the invention is the provision of a gearing of this character wherein the construction thereof is novel in form so as to minimize liability of disorder and to assure the highest efficiency in operation.

A still further object of the invention is the provision of a gearing of this character which is simple in construction, thoroughly reliable and efficient in operation, strong, durable, and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a fragmentary elevation of a gearing constructed in accordance with the invention;

Figure 2 is a vertical longitudinal sectional view thereof;

Figure 3 is a vertical transverse sectional view;

Figure 4 is a fragmentary perspective view of the eccentric arms assembled with respect to each other, the barrel or sleeve being broken away;

Figure 5 is a perspective view of the barrel or sleeve;

Figure 6 is a fragmentary sectional view on the line 6—6 of Figure 2.

Similar reference characters indicate corresponding parts throughout the several views of the drawings.

Referring to the drawings in detail, A designates a portion of a driving shaft which is operated from a motor or other prime mover and is connected thereto in any desirable manner, and B a portion of the driven shaft or secondary mover, which may be connected in any suitable manner with mechanism to be driven, the driving shaft being formed at its free end with an eccentric 10, while the driven shaft B has integrally formed therewith, at the end adjacent the eccentric, an internal toothed gear wheel 11, which is preferably constructed with the internal teeth 12 at the inner periphery of the flange or rim 13, the shafts A and B being journaled in a boxing or casing including the sections 14 and 15, respectively, which are bolted or otherwise fastened together, and in which instance each is formed with a base 16 which may be made fast to a support or other stationary part. The sections 14 and 15 are readily separable from each other so as to permit access to the interior of the boxing or housing, which conceals or confines therein the gearing hereinafter set forth in detail.

The shafts A and B are rotatably engaged in bushings or bearings 17 which are fitted within the sections 14 and 15 of the boxing or housing. Mounted concentrically with respect to the shaft A in the section 15 of the boxing or housing are the stems 18 of oscillatory guides 19, the stems being fitted within the bushings or bearings 20 carried in said section 15 of the boxing or housing, and working through these guides are slides 20' in which are pivoted eccentric arms 21, 22 and 23, respectively, although it is to be understood that the number of arms may be increased, while in this instance only three are shown, and these arms 22 are formed at their inner ends with eccentric sleeves 24 which loosely surround the eccentric 10 and are held in close assembled relation to each other through the medium of a split barrel or sleeve 25 which is formed with cut away portions 26 for a clearance for the arms 21, 22 and 23 in their working.

These arms 21, 22 and 23, at their outer free ends, describe a path of movement resembling an ellipse-like curve, and several of the same are always in mesh with the teeth 12 of the gear 11. The outer ends 27 of the arm 21, 22 and 23, simulate gear teeth and are so shaped or formed as to impart a practically uniform steady motion to the gear 11 on the operation of the arms which oscillate in the guides 19, the latter moving in the bushings or bearings 20 in the section 15 of the boxing or housing. The boxing or housing is constructed to render the same oil-tight so that it will hold oil to provide for the constant lubrication of the gearing in a bath of oil.

The gearing may be constructed to run on an external toothed gear as well as the internal toothed gear with slight changes, but without deviating from the principle of operation involved in the working of the gearing hereinbefore set forth.

It will be noted that the toothed end 27 of each arm in oscillating in an ellipse-like path will be nearly in full mesh with one of the teeth 12 of the gear 11 during its working period, and in this instance, as illustrated, one-third of a revolution of the shaft A. It is also contemplated within the scope of the invention to vary the construction of the arms 21, 22 and 23 and also the eccentric 10 in such proportion to advance the gear 11 one or more teeth and also one or more teeth may be cut or formed on each arm.

The split barrel or sleeve 25 is adjustable through the medium of the bolt 28 so as to distribute the work done by the eccentric 10 over the whole surface of the eccentric, thus reducing the size of the eccentric to the smallest size necessary to do the work.

In gear and pinion drives the ratio is rather low for this reason. Pinions have a minimum of twelve teeth and on a gear and pinion having a ratio of twelve to one the gear would have one hundred forty-four teeth, which is approximately about the limit for diameter, that is to say, a convenient limit, so that for any ratio above twelve to one the foregoing gear construction would apply. It will be noted that the gear on the driven shaft B will rotate in a direction opposite to the driving shaft A. If it is desired to run the driving and driven shafts in the same direction it will be necessary to mount the internal and external toothed gears stationary as a part of the casing or frame and provide the driven shaft on its inner end with a spider carrying guide bearings for the toothed levers, and with this construction the driving and driven shafts will both rotate in the same direction.

It will be apparent that considerable saving may be had in the first cost in some large low speed drives by using the gearing hereinbefore set forth and a small high speed motor. It is understood that when the speed of a motor is reduced the weight, and necessarily the cost, rises very rapidly and in some cases is almost, if not entirely, prohibitive. The construction of gearing eliminates the necessity of train gearing, enables a reduction in the number of parts and permits the said gearing to be easily and cheaply made, as well as eliminating liability of disorder and at the same time assuring maximum efficiency in operation. It is to be understood that the invention in its scope contemplates the employment of any means, other than a gear and pinion or a worm and worm wheel, for imparting uniform motion, at a higher or lower number of revolutions per minute, from a driving to a driven shaft.

From the foregoing description, taken in connection with the accompanying drawings, the construction and operation of the herein described gearing will be readily apparent and, therefore, a more extended explanation has been omitted.

Having thus described my invention, I claim:

1. In combination with driving and driven shafts, of a toothed gear on said driven shaft, eccentrically movable means operated by said driving shaft, a member controlled by said means, and a sliding part rotatably supported for directing the member for action upon the gear.

2. In combination with driving and driven parts, of an internally toothed gear on the driven part, eccentrically movable means within said gear and operated by said driving part for action upon the gear, and reciprocating means forming a pivot bearing for said movable means and supported for reciprocation to impart a curvilinear movement to said first named means.

3. In combination with driving and driven shafts, of an internally toothed gear on said driven shaft, eccentrically movable means within said gear and operated by said driving shaft for action upon the gear, and slidable means cooperative with the eccentrically movable means to form a pivotal bearing for the latter for directing the same to and from the gear.

4. In combination with driving and driven shafts, of an internally toothed gear on said driven shaft, eccentrically movable means within said gear and operated by said driving shaft for action upon the gear, slidable means for said means, and guiding means cooperative with the second named means.

5. The combination with an internally toothed gear, of eccentrically movable triple means for operation within the gear to engage its teeth at three points thereof and slidable means supported for reciprocation to allow elliptical motion to the first named means.

6. The combination with a gear, of eccentrically movable triple means for action upon the gear, slidable means supported for reciprocation to allow elliptical motion to the first named means, and means for driving said first named means.

7. The combination with a movable gear, of a member having an elliptical motion for moving said gear, means for imparting movement to the member, means for guiding the member in its movement, and reciprocative means in the guiding means for said member.

8. The combination with a movable gear, of a member for moving said gear, means for imparting movement to the member, means for guiding the member in its movement, reciprocative means in the guiding means for said member, and a casing for the gear and member.

9. The combination with a movable gear, of a member having an elliptical motion for moving the gear, means for imparting movement to the member, means for guiding the member in its movement, reciprocative means for the member and supported by the guiding means, and a casing for all of the parts and adapted to contain oil for continuously lubricating the gear and member.

10. In a gearing, a driving shaft, a driven shaft, an eccentric on the driving shaft, a gear on the driven shaft, oscillatory members disposed concentrically about the driving shaft, and a plurality of arms connected to the eccentric and movable through the oscillatory members for engagement with the gear.

11. In a gearing, a driving shaft, a driven shaft, an eccentric on the driving shaft, a gear on the driven shaft, oscillatory members disposed concentrically about the driving shaft, a plurality of arms connected to the eccentric and movable through the oscillatory members for engagement with the gear, and an adjustable sleeve for said arms.

12. In a gearing, a driving shaft, a driven shaft, an eccentric on the driving shaft, a gear on the driven shaft, oscillatory members disposed concentrically about the driving shaft, a plurality of arms connected to the eccentric and movable through the oscillatory members for engagement with the gear, an adjustable sleeve for said arms, and a casing enclosing the gear, arms, member and eccentric.

13. In a gearing, a driving shaft, a driven shaft, an eccentric on the driving shaft, a gear on the driven shaft, oscillatory members disposed concentrically about the driving shaft, a plurality of arms connected to the eccentric and movable through the oscillatory members for engagement with the gear, an adjustable sleeve for said arms, a casing enclosing the gear, arms, member and eccentric, and bearings for the oscillatory members journaled in said casing.

14. In a gearing, a driving shaft, a driven shaft, an eccentric on the driving shaft, a gear on the driven shaft, oscillatory members disposed concentrically about the driving shaft, a plurality of arms connected to the eccentric and movable through the oscillatory members for engagement with the gear, an adjustable sleeve for said arms, a casing enclosing the gear, arms, member and eccentric, bearings for the oscillatory members journaled in said casing, and bushings for the driving and driven shafts.

15. The combination with a rotatable gear, of eccentrically operated means forming a driving element for the gear, and slidable means supported for reciprocation and active upon the first named means to direct the latter toward and away from engaging positions with the gear for operation thereon.

16. The combination of a gear, an eccentrically movable means forming a driving element for the gear, a member forming a movable support for said means to bring the same into and out of engagement with the gear, and reciprocatory means carrying said member.

17. The combination of a toothed gear, means forming a driving element, a member controlled by said means for action upon the gear, and a slidable means supported for reciprocation to direct said member for its action upon the gear.

18. The combination of a driven element, means forming a driving element in axial alignment with said driven element, a member connected with said means for action upon the driven element, and means movable radially relative to said elements for reciprocation and engaging the member to direct it for action upon the driven element.

In testimony whereof I affix my signature.

GLENN ARTHUR SHAFFER.